United States Patent [19]

Cowgill

[11] Patent Number: 5,835,566
[45] Date of Patent: Nov. 10, 1998

[54] SYSTEM AND METHOD FOR PROVIDING IN-BAND AND OUT-OF-BAND TESTING OF TELECOMMUNICATIONS NETWORK COMPONENTS

[75] Inventor: George A. Cowgill, Parker, Tex.

[73] Assignee: Telecom Technologies, Inc., Richardson, Tex.

[21] Appl. No.: 624,166

[22] Filed: Mar. 29, 1996

[51] Int. Cl.[6] .............................. H04M 1/24; H04M 3/08; H04M 3/22

[52] U.S. Cl. .................................... 379/10; 379/6; 379/1; 379/26; 379/29; 370/244; 370/249

[58] Field of Search .............................. 379/5, 6, 27, 28, 379/29, 1, 10, 12, 14, 26, 242, 251, 252, 249; 370/241, 244, 250, 467, 522, 524

[56] References Cited

U.S. PATENT DOCUMENTS

| | | | |
|---|---|---|---|
| 3,626,383 | 12/1971 | Oswald | 340/172.5 |
| 3,969,594 | 7/1976 | Deluca et al. | 179/175.3 R |
| 4,393,491 | 7/1983 | Ashlock et al. | 370/13 |
| 4,430,530 | 2/1984 | Kandell et al. | 179/175.2 D |
| 4,594,480 | 6/1986 | Betton | 179/175.3 R |
| 4,704,716 | 11/1987 | Bowers et al. | 370/58 |
| 4,885,738 | 12/1989 | Bowers et al. | 370/58.1 |
| 4,989,202 | 1/1991 | Soto et al. | 370/110.1 |
| 5,065,422 | 11/1991 | Ishikawa | 379/11 |
| 5,187,732 | 2/1993 | Suzuki | 379/5 |
| 5,208,846 | 5/1993 | Hammond et al. | 379/15 |
| 5,278,977 | 1/1994 | Spencer et al. | 379/1 |
| 5,280,626 | 1/1994 | Kondo et al. | 395/500 |
| 5,335,342 | 8/1994 | Pope et al. | 395/575 |
| 5,343,461 | 8/1994 | Barton et al. | 379/1 |
| 5,347,270 | 9/1994 | Matsuda et al. | 340/825.8 |
| 5,359,646 | 10/1994 | Johnson et al. | 379/27 |
| 5,375,159 | 12/1994 | Williams | 379/29 |
| 5,384,822 | 1/1995 | Brown et al. | 379/10 |
| 5,384,823 | 1/1995 | Brenski et al. | 379/10 |
| 5,390,232 | 2/1995 | Freeman et al. | 379/15 |
| 5,392,328 | 2/1995 | Schmidt et al. | 379/10 |
| 5,414,836 | 5/1995 | Baer et al. | 395/575 |
| 5,425,075 | 6/1995 | Selden et al. | 379/10 |
| 5,426,688 | 6/1995 | Anand | 379/13 |
| 5,450,468 | 9/1995 | Bushnell | 379/6 |
| 5,457,729 | 10/1995 | Hamann et al. | 379/2 |
| 5,475,732 | 12/1995 | Pester | 379/1 |
| 5,495,516 | 2/1996 | Lee et al. | 379/1 |
| 5,633,909 | 5/1997 | Fitch | 379/15 |
| 5,636,202 | 6/1997 | Garney | 379/29 |
| 5,636,260 | 6/1997 | Chopping | 379/10 |
| 5,661,778 | 8/1997 | Hall et al. | 379/29 |
| 5,680,390 | 10/1997 | Robrock | 370/229 |
| 5,680,391 | 10/1997 | Barron et al. | 370/110.1 |
| 5,684,789 | 11/1997 | Habeck et al. | 370/244 |
| 5,699,403 | 12/1997 | Ronnen | 379/32 |
| 5,712,896 | 1/1998 | Lee et al. | 379/10 |
| 5,717,750 | 2/1998 | Adams, Jr. et al. | 379/213 |
| 5,726,972 | 3/1998 | Ferguson | 370/13 |
| 5,726,975 | 3/1998 | Kiyotsugu et al. | 370/228 |
| 5,737,517 | 4/1998 | Kite et al. | 379/10 |

Primary Examiner—Paul Loomis
Assistant Examiner—Rexford N. Barnie

[57] ABSTRACT

For use in a telecommunications network containing a component to be tested ("UUT"), a system for, and method of, providing in-band and out-of-band signals to test and analyze the UUT. The system includes: (1) a programmable switch coupled to the UUT through the telecommunications network via an in-band and out-of-band signaling path capable of providing in-band and out-of-band signaling to the UUT and (2) a host controller coupled to the switch for communication of data therebetween, the host controller further couplable to the UUT via an out-of-band signaling path capable of providing out-of-band signaling to the UUT, the host controller capable of storing and executing a sequence of instructions to test the UUT via at least one of the in-band and out-of-band signaling paths, the switch being programmable and the sequence of instructions being adaptable to allow the switch and the host controller to adapt to a particular signaling protocol of the UUT.

22 Claims, 12 Drawing Sheets

Test Scheduler

Schedule Data

Suite Name

Scheduled ID

1210  Description

Scheduled Time

Scheduled Date

Status

Owner

Test Suite List

CallingCard
SpeedCall
WithCOT
WithoutCOT
PTS_Only
SS7_Only
ISDN_Only

1230

| User | Test Suite Name | Schd ID | SchdTime | #TCs | SUT1 | SUT2 | Status |
|------|----------------|---------|----------|------|------|------|--------|
| Phil | CallingCard | 092895_0002 | 09/30/95 15:30 | 234 | RES302 | RES307 | Active |
| Robb | SpeedCall | 092895_0003 | 09/30/95 18:00 | 424 | RES302 | RES307 | Scheduled |

1220

1240

[ Save ]  [ Delete ]  [ Close ]  [ Help ]

Figure 12

SYSTEM AND METHOD FOR PROVIDING IN-BAND AND OUT-OF-BAND TESTING OF TELECOMMUNICATIONS NETWORK COMPONENTS

TECHNICAL FIELD OF THE INVENTION

The present invention is directed, in general, to telecommunications network and, more specifically, to a system and method for in-band and out-of-band testing of telecommunications networks.

BACKGROUND OF THE INVENTION

Several classes of telecommunications equipment cooperate to form a telecommunications network. In general, the telecommunications network begins and ends at the customer's premises with station or terminal equipment including, for instance, multiple-line key telephone instruments, private branch exchanges ("PBXs") or data equipment (e.g., modems and multiplexers). The station equipment is used for intraorganizational communication within a narrow range, usually within a building or campus, and it connects to private or common carrier facilities for communication over a wider range.

Multiple customers' premises are connected through a local loop (e.g., wires, poles, terminals, conduit) to local exchange carrier ("LEC") equipment or central offices ("COs"). The COs communication with one another through interoffice trunks by exchanging signals and establishing talk connections to set up paths thereby interconnecting users within the telecommunications network.

As the number of COs in a region increases, it becomes impractical to connect every office to every other office with trunks. To solve this dilemma, the telecommunications network is equipped with tandem switches to interconnect trunks. Local tandem switches connect local trunks and toll or interexchange tandem switches connect the COs to interexchange trunks leading outside the free calling area (i.e., long distance calling).

The process of transporting information between users occurs over transmission lines including open wire, twisted pair copper cables, terrestrial microwave radio, fiber optic guide lines and satellites, to name a few. Multiplexing equipment divides these backbone transmission facilities into voice channels. The previously described representative network components and transmission facilities are submitted to illustrate that several distinct elements are associated with transmitting information, either by digital or analog signals, between communicating parties.

Additionally, a close interrelatedness of the telecommunications network requires standards and signaling protocols that enable the telecommunications equipment to communicate with one another. Unfortunately, the need for standardization and the need for technical progress sometimes conflict, because standards are often not set until the technology has been proven in practice. Ironically, most often the only way to prove the technology is through extensive use. Therefore, when the time comes to set a standard, a large base of installed equipment designed to proprietary standards and employing separate signaling protocols is already in place.

The policies of many standards-setting organizations preclude their adopting proprietary standards, even if the manufacturer is willing to make them public. Also, competing manufacturers are represented on the standards-setting bodies of the United States thereby providing an incentive for bodies not to accept proprietary standards. As a result, even after standards are adopted, a considerable amount of equipment exists that does not conform to an adopted standard. Conversely, some standards are set before they are tested in commercial applications. In these cases, the standard may be adopted before any practical demonstration of its technical feasibility is determined. Moreover, even when standards are accepted in the industry, partial compliance with the specifications making up the standards and multiple ways of interpreting the specifications further complicates the standards base in the industry.

Notwithstanding the various components (employing differing standards and signaling protocols) that constitute the telecommunications network, some degree of testing capability is critical to maintain the reliability of the network. Even if the test is as simple as a check at a common carrier's demarcation point to determine whether trouble is in customer or carrier facilities, the ability to make these tests can pay dividends in reducing maintenance costs. Complex networks dictate reliable testing capability, not only to control costs, but to restore failed service quickly.

There are two objectives inherent in telecommunications network testing. The first objective is to establish benchmarks that serve as references or to confirm that design objectives are being achieved. The second objective is to locate faulty network elements by isolating defective pieces of equipment. The first category of tests, usually referred to as acceptance or proof-of-performance testing, is conducted to establish a data base that may later serve as a basis for fault locating tests. The second category of tests typically does not require the depth and sophistication of the first. It is often sufficient to measure a single variable under such circumstances; the single variable measurements can, in turn, be automated to survey a complex network rapidly and reliably.

System reliability has increased dramatically over the years in spite of the ever-increasing complexity thereof. Nevertheless, every element of a telecommunications network is subject to failure and when a circuit or service is in trouble, it is difficult to determine what portion of the network is at fault. Service irregularities and end-to-end tests can reveal the presence of a fault, but the defective element can be identified only by testing to isolate the trouble.

Moreover, with today's networks, testing is complicated by several factors. First, telecommunications equipment is obtained from multiple vendors. Second, trouble must be isolated by testing interfaces between vendors. Third, the responsibility for impairments is often unclear and vendors are not quick to claim responsibility. Fourth, incompatibility of interfaces may arise and lacking universal interface standards and signaling systems and protocols, the user is left somewhere therebetween to negotiate a solution. Fifth, transmission and switching systems of the telecommunications network require specialized test equipment to perform general tests and some tests that are unique to a specific manufacturer.

As referred to above, switching systems (e.g., the interexchange tandem switch), in their simplest form, connect the output of one path to the input of another so that information may be passed therebetween. The switching systems are incorporated into a switching network or matrix (such as a telecommunications network as hereinafter described) that connects paths between input and output ports. Typically, the switching systems include central and distributed processors or controllers to connect the paths through the switching network and to perform signaling and call processing functions. In conjunction therewith, the switching systems include a data base that stores the system configuration and addresses and features of lines and trunks. The switching systems also include line ports, for ultimate connection to the users, and trunk ports that interface interoffice trunks.

The call processing function is performed by processor-driven controllers (thereby forming the "brains" of the network) that determine the route of the call over signal paths that encompass the nerve system of the telecommunications network. The signals travel between controllers in the network either over the talking path ("in-band") or over separate data networks ("out-of-band"). Within the network the signals are converted to many different forms to accommodate differences in transmission facilities, equipment vintages and signaling systems and protocols.

To demonstrate the complexity that encompasses even a conventional calling card telephone call, a representative telecommunications network or network 100 including network components and telecommunication paths is illustrated in FIG. 1. The network 100 includes a first telephone instrument 110 communicating with a second digital telephone instrument 120 connected to a PBX 125. The first telephone instrument 110 and the second telephone instrument 120 (via the PBX 125) are each connected to a first and second CO 130, 140, respectively. The first CO 130 is connected to a first interexchange tandem switch 150 by an in-band path 133 and an out-of-band path 135 [via a signal transfer point ("STP") 138]. The second CO 140 is connected to a second interexchange tandem switch 160 by an in-band path 143 and by out-of-band path 145 (via a STP 148). The first and second interexchange tandem switches 150, 160 are interconnected by an in-band path 155 and by an out-of-band path 165 (via STPs 170, 175). Additionally, a card platform 180, having a database (not shown), is connected to the second interexchange tandem switch 160 by an in-band path 185 and by an out-of-band path 190 (via the STP 175).

Now that the basic structure of the network 100 has been described, a conventional calling card telephone call originating from the first telephone instrument 110 will hereinafter be described. A first set of signals ensues between the first telephone instrument 110 and the first CO 130 via an in-band path 115 (e.g., a T-1 link). The signaling process employing, for instance, a dual tone multi-frequency ("DTMF") signaling protocol generally occurs as follows. First, a seizure message is sent from the first telephone instrument 110 to the first CO 130. The first CO 130 responds with a wink message to the first telephone instrument 110. The first telephone instrument 110 then sends a set of digits, including information such as the call is a calling card call, to the first CO 130. The first CO 130 again responds with a wink message to the first telephone instrument 110. From the above described set of signals, the first CO 130 determines that the call is calling card call connecting through a long distance exchange system.

The communication between the first CO 130 and the first interexchange tandem switch 150 takes on two different forms via two separate paths. The user information (i.e., voice data) traverses the in-band path 133 [e.g., a Signaling System 7 ("SS7") bearer channel]. The signaling data, however, traverses the out-of-band path 135 (e.g., a SS7 signaling channel) via the STP 138. The signaling process employing the SS7 signaling protocol generally occurs as follows. First, an "I AM" signal and continuity request (including information pertaining to the calling party, billing service, etc.) is transmitted out-of-band from the first CO 130 to the first interexchange tandem switch 150. Concurrently, a tone check set of signals transpires in-band between the two communicating offices. Next, the first CO 130 sends a continuity successful message out-of-band to the first interexchange tandem switch 150. Finally, an address complete message ("ACM") is transmitted out-of-band from the first interexchange tandem switch 150 to the first CO 130. From the above described signals, the first interexchange tandem switch 150 determines that the connecting point is the second interexchange tandem switch 160 and a similar set of signals (as described regarding the communication between the first CO 130 and the first interexchange tandem switch 150) are transmitted between the first and second interexchange tandem switches 150, 160.

The second interexchange tandem switch 160, then, interprets the signals sent thereto and determines that the call must be originally routed through the card platform 180. The second interexchange tandem switch 160 transmits a continuity signal out-of-band to the card platform 180 to set-up communication between the two offices. After the out-of-band signal negotiation is completed between the second interexchange tandem switch 160 and the card platform 180, the card platform concludes with a answer message that eventually reaches the first telephone instrument 110 in the form of an off-hook signal. In response thereto, the first telephone instrument 110 transmits in-band digit signals that are routed to the card platform 180, while, at the same time, out-of-band signaling is occurring to verify information such as the subscriber calling card number. Once the card platform 180 verifies all the subscriber information, the path between the first telephone instrument 110 and the card platform 180 is disconnected.

A talk path is, then, created between the first telephone instrument 110 and the second CO 140 through a combination of in-band and out-of-band signaling through the components of the network 100. The communication between the second CO 140 and the second telephone instrument 120 (via the PBX 125) occurs through a primary rate interface ("PRI") integrated services digital network ("ISDN") path 127 including a combination of twenty-three (23) B-channels (for user information) and one (1) D-channel (for signaling information). The signaling process thereafter generally occurs as follows. First, the second CO 140 sends a set-up message (including attributes of the call such as the identity of the calling party) to the second telephone instrument 120. The second telephone instrument 120 responds with a call proceeding message to the second CO 140. Third, the second CO 140 sends an alerting message that is mapped through the network 100 to the first CO 130. Once a connection is established, a connect message is transmitted by the second CO 140 through the first CO 130 to the first telephone instrument 110. Once the parties have completed their conversation, the first telephone instrument 110 goes on-hook and the talk path is disconnected to the second telephone instrument 120. During the call processing between the first and second telephone instrument 110, 120 continuous translations are occurring between the different protocols governing the operation of each component within the network 100. While the aforementioned call processing signals between the first and second telephone instrument 110, 120 were presented in skeleton form, one can readily understand therefrom the complexity involved in communicating information between remote locations in a telecommunications network.

Again, the ability to test and troubleshoot the components and systems in evaluating a telecommunications network is an important consideration. Moreover, testing telecommunications equipment and networks is not a new and novel concept. For instance, there are systems directed at the physical layer and limited to testing the links between various subscriber line circuits and trunks through the respective stages of the network to determine that all connections are properly made therein. Additionally, there are systems directed to testing specific analog switching systems and the signaling associated therewith.

As an example of a telecommunications test device, U.S. Pat. No. 5,384,822 by Brown, et al., issued on Jan. 24, 1995 and entitled "Computer Controlled Test Facility for a Telecommunication Switch," provides a test facility for the automatic generation of a plurality of tests for a telecommunications switch. A plurality of telephone devices responsive to computer commands are connected to a telecommunications switch. A computer controlled apparatus sends command messages to the telephone devices thereby initiating conventional telephony actions such as dialing. The apparatus receives reply messages from the telephone devices that represent the status parameters such as ringing associated with the telephone device. Reply messages are identified relative to the previously sent command messages. If the actual status of the parameters represented by the reply message matches an anticipated status of the parameters corresponding to actions expected in response to a command message, a successful test of the switch functions associated with the command message results. An unmatched condition corresponds to a test failure requiring user analysis.

Analogous to other testing systems in the prior art, Brown, et al. has inherent limitations in its design. First, the objective of Brown, et al. is to test line side and telephone instrument interfaces and in fulfilling its objective the system only emulates the telephone instrument. Second, Brown, et al. is generally limited to testing existing features at existing or new installations. Finally, the application of Brown, et al. is limited to equipment that operate under a set group of standards and signaling protocols.

The existing base of telecommunications testing equipment analyzes discrete components or facets of the telecommunications network and, generally, does not have the flexibility to handle the ever-increasing complexities and new interoperability standards replete in telecommunications equipment and networks. In connection therewith, the testing of telecommunications networks is further complicated because of the various signaling protocols employed by separate components within the very same network.

Accordingly, what is needed in the art is a universal system and method for testing a telecommunications network that, in particular, tests the signaling and call processing functionality of the telecommunications equipment under test and accounts for any variations in the operation and protocols that may arise therein.

SUMMARY OF THE INVENTION

To address the above-discussed deficiencies of the prior art, it is a primary object of the present invention to provide a system and method for testing a wide variety of telecommunication components. Thus, the system and method should be adaptable to allow for any variations in the operation and protocols that may arise.

In the attainment of the above-described primary object, one embodiment of the present invention provides, for use in a telecommunications network containing a component to be tested ("UUT"), a system for, and method of, providing in-band and out-of-band signals to test and analyze the UUT. The system includes: (1) a programmable switch coupled to the UUT through the telecommunications network via an in-band and out-of-band signaling path capable of providing in-band and out-of-band signaling to the UUT and (2) a host controller coupled to the switch for communication of data therebetween, the host controller further couplable to the UUT via an out-of-band signaling path capable of providing out-of-band signaling to the UUT, the host controller capable of storing and executing a sequence of instructions to test the UUT via at least one of the in-band and out-of-band signaling paths, the switch being programmable and the sequence of instructions being adaptable to allow the switch and the host controller to adapt to a particular signaling protocol of the UUT.

The present invention provides testing of components that employ in-band or out-of-band signaling. Again, "in-band," for the purposes of the present invention, is defined as use of the same physical path for signaling and user information, such as voice, video and data. "Out-of-band" signaling is defined as signaling that traverses a completely different physical path than does the user information path. "Sequence of instructions" in the context of the present invention relates to a pattern of executable instructions to be performed by a general purpose computer. Additionally, "programmable" denotes the ability to change, without limitation, a feature, function or extension, assigned to a component in the network without rewiring the component in the network. Finally, a "particular signaling protocol" in the context of the present invention refers to a standard that a component in the telecommunications network can accept and use to perform various signaling functions therein. Again, the present invention automatically tests the signaling and call processing functionality of the telecommunications equipment under test and accounts for any variations in the operation and protocols that may arise throughout the network. In conjunction therewith, the system automatically configures the UUT, if requested.

In an alternative embodiment of the present invention, the sequence of instructions is hierarchically structured as a test suite comprising a test case, the test case comprising a test logic program ("TLP"), the TLP comprising a test independent building block ("TIBB"). The sequence of instructions are created in a test creation environment ("TCE") that supports a functional, test independent approach to call processing simulation by providing signaling scheme selection. The signaling scheme is selected by test building blocks or TIBBs and a TLP editor that allows a user to rapidly create and customize new test scenarios. The user thus creates the logic that the system of the present invention may interpret to test the UUT.

In an alternative embodiment of the present invention, the host controller provides a graphical user interface ("GUI") for allowing a user to manipulate symbols presented on the GUI to define the sequence of instructions. The present invention presents a user-friendly interface whereby the user may scroll through windows and select icons, representing TIBBs, for instance, to define the sequence of instructions. In other words, the GUI allows the user to select, in an intuitive and guided fashion, the TIBBs that the user desires to ultimately build a test suite to test the UUT. The system automatically configures the UUT and performs the test suite for the user's benefit. As a result, the user may test the features of the UUT and the interface complexities, such as the configuration of the UUT, are transparent to the user.

In one aspect of the above-described embodiment of the present invention, the GUI provides fields for the user to enter data pertaining to a test. The GUI provides an empty line in a dialog box where the user may enter the data or, alternatively, the user may modify TIBBs previously constructed to make-up a semi-custom test case.

In another aspect of the above-described embodiment of the present invention, the GUI presents a series of test results to the user. The system of the present invention not only provides fields for the user to enter data, but it also provides the user with results that may be compared to an expected or anticipated performance of the test suite on the UUT. The system therefore is capable of analyzing the operation of the UUT and providing reports demonstrating the results thereon.

In an alternative embodiment of the present invention, the switch is embodied as a plurality of modules, thereby allowing the switch to adapt to the telecommunications network and the UUT. The switch is a programmable dummy switch that contains basic switching software and relies on instructions by the host controller for providing interface to the telecommunications network. In maintaining the flexibility of the system, the switch is modular in design to further facilitate the capability to interface with UUT's employing in-band, out-of-band or a combination of signaling systems.

In an alternative embodiment of the present invention, the host controller is capable of receiving result data from the UUT via the switch. The system of the present invention serves two objectives inherent in telecommunications network testing. The system may locate faulty network elements by isolating defective components therein. Additionally, the system may establish benchmarks that serve as references or to confirm that design objectives are being achieved. The latter testing mode of operation is generally referred to as acceptance or proof-of-performance testing. In either mode of operation, it is critical that the system receive result data from the UUT. In this embodiment the result data traverse the switch en-route to the host controller for processing therein.

In an alternative embodiment of the present invention, the particular signaling protocol is an out-of-band signaling protocol selected from the group consisting of: (1) D-channel of an Integrated Services Digital Network ("ISDN") and (2) Signaling System 7 ("SS7"). Those of skill in the art will understand that any out-of-band signaling protocol is well within the broad scope of the present invention.

In an alternative embodiment of the present invention, the particular signaling protocol is an in-band signaling protocol selected from the group consisting of: (1) Dual Tone Multi-Frequency ("DTMF") and (2) Multi-Frequency R1 ("MFR1"). Those of skill in the art will understand that any in-band signaling protocol is well within the broad scope of the present invention.

In an alternative embodiment of the present invention, the host controller comprises circuitry for scheduling an execution time for the sequence of instructions. The host controller can therefore immediately execute the sequence of instructions; the host controller may be instructed to execute the sequence of instructions at a later time or date; the host controller may execute the sequence of instructions in a pipeline behind other test suites presently testing the UUT. The scheduling circuitry further enhances the flexibility of the system of the present invention.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent assemblies do not depart from the spirit and scope of the invention in its broadest form.

BRIEF DESCRIPTION OF THE DRAWINGS

For a more complete understanding of the present invention, and the advantages thereof, reference is now made to the following descriptions taken in conjunction with the accompanying drawings, in which like numbers designate like elements, and in which:

FIG. 10 illustrates a view of a configuration window of the GUI showing, in particular, a test case builder menu;

FIG. 12 illustrates a view of a configuration window of the GUI showing, in particular, a test scheduler menu;

DETAILED DESCRIPTION

Figure 1:
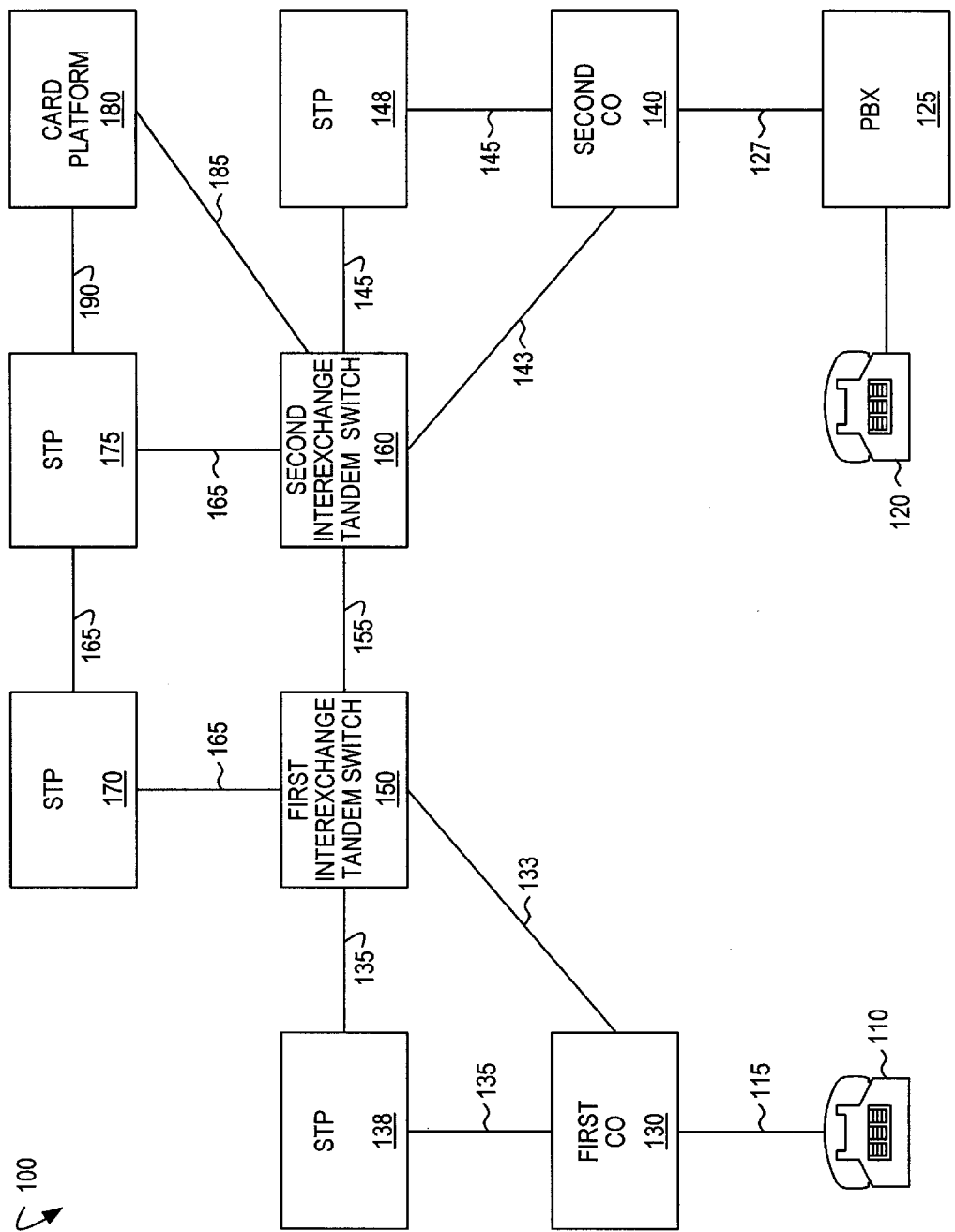
FIG. 1 illustrates a representative telecommunications network that forms an environment within which the present invention can operate.
Figure 2:
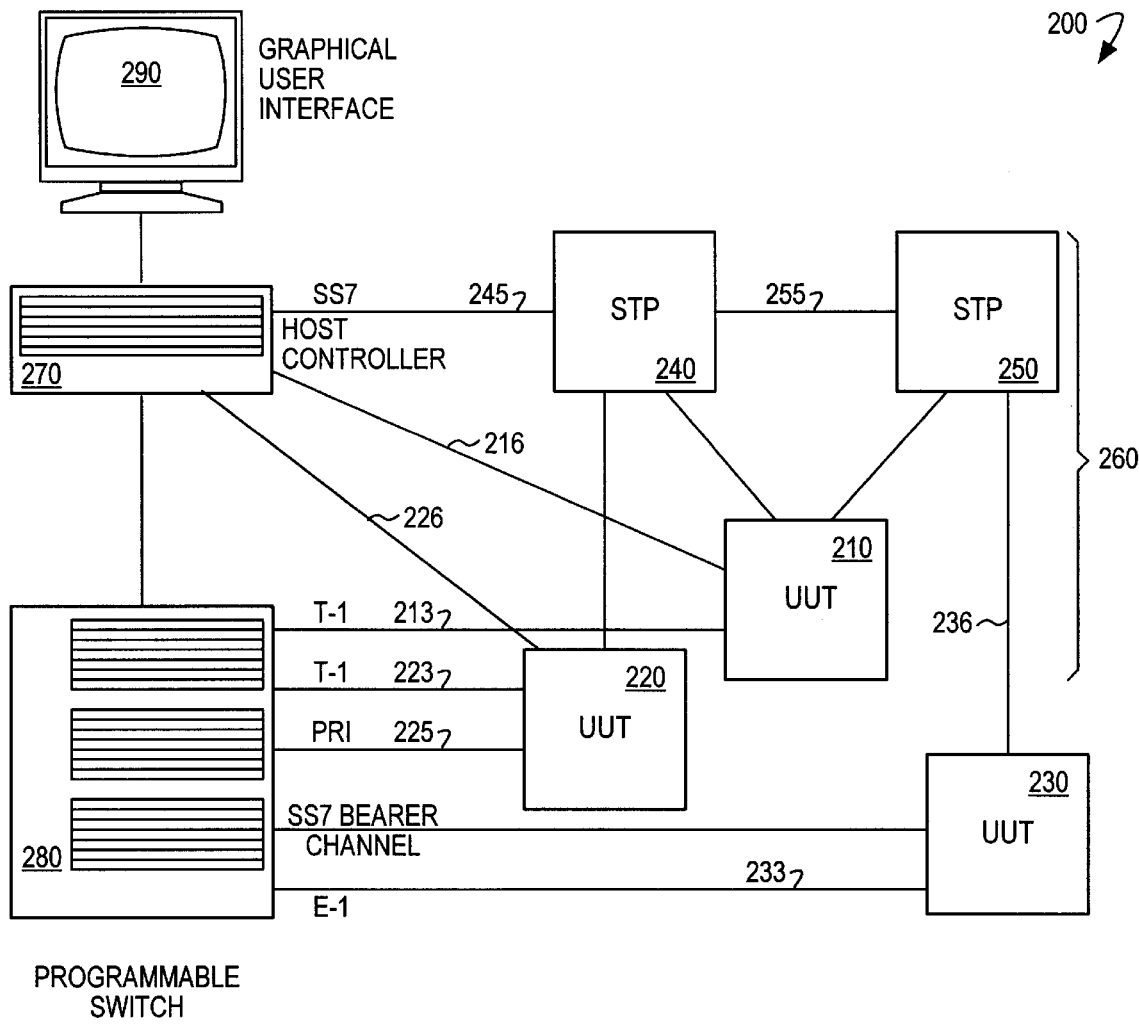
FIG. 2 illustrates another network that forms an environment that a system according to the principles of the present invention can operate.

Referring to FIG. 2, illustrated is another network (e.g., telecommunications network) 200 that forms an environment that a system 260 according to the principles of the present invention can operate. The network 200 comprises first, second and third components or unit under test ("UUTs") 210, 220, 230, respectively, and a plurality of signal transfer points ("STPs") 240, 250. In the illustrated embodiment, the UUTs 210, 220, 230 are network switches that employ different signaling protocols for call processing. For instance, the first UUT 210 employs an out-of-band signaling protocol, namely, signaling system 7 ("SS7"); the second UUT 220 also employs out-of-band signaling protocols, namely, D-channel signaling via an integrated services digital network ("ISDN") and SS7, and an in-band signaling protocol via a T-1 trunk; the third UUT 230 employs an in-band signaling protocol via an E-1 trunk. One of ordinary skill in the art will understand that the network 200 and UUTs 210, 220, 230 are presented for illustrative purposes only and other network configurations employing the same or different components (using a multitude of signaling protocols) are well within the broad scope of the present invention.

A system 260 for testing the network 200 and, particularly, the UUTs 210, 220, 230, according to the principles of the present invention, is coupled to the network 200 via a programmable switch 270 and a host controller 280 [via a graphical user interface ("GUI") 290]. The system 260 provides in-band and out-of-band signals to test the UUTs 210, 220, 230. The system 260 includes the programmable switch 280 coupled to the UUTs 210, 220, 230 through the network 200 via in-band signaling paths 213, 223, 233 and an out-of-band signaling path 225 capable of providing in-band and out-of-band signaling to the UUTs 210, 220, 230.

The system 260 also includes the host controller 270 coupled to the switch 280 for communication of data therebetween (via, for instance, an RS-232 connection) The host controller 270 is further coupled to the UUTs 210, 220, 230 via out-of-band signaling paths 216, 226, 236, [using, for instance, a Transmission Control Protocol/Internet Program ("TCP/IP") network layer control] and the STPs 240, 250, (through a standardized SS7 Message Transfer Part, via signaling paths 245, 255) to provide out-of-band signaling to the UUTs 210, 220, 230. The host controller 270 is capable of storing and executing a sequence of instructions to test the UUTs 210, 220, 230 via at least one of the in-band and out-of-band signaling paths. The switch 280 is programmable and the sequence of instructions are adaptable to allow the switch 280 and the host controller 270 to adapt to a particular signaling protocol of the UUTs 210, 220, 230. Again, the system 260 automatically tests the signaling and call processing functionality of the telecommunications equipment under test and accounts for any variations in the operation and protocols that may arise throughout the network 200. In conjunction therewith, the system 260 automatically configures the UUTs 210, 220, 230, if requested, to further automate the testing of the network 200.

The system 260 also includes the GUI 290 associated with the host controller 270. The GUI 290 allows a user to manipulate symbols presented on the GUI 290 to define the sequence of instructions. The user may scroll through windows and select icons, representing test independent building blocks ("TIBBs"), for instance, to define the sequence of instructions. The system 260 then automatically configures the UUTs 210, 220, 230 and performs the test for the user's benefit. As a result, the user may test the features of the UUTs 210, 220, 230 and the interface complexities, such as the configuration of the UUTs 210, 220, 230, are transparent to the user.

Figure 3:
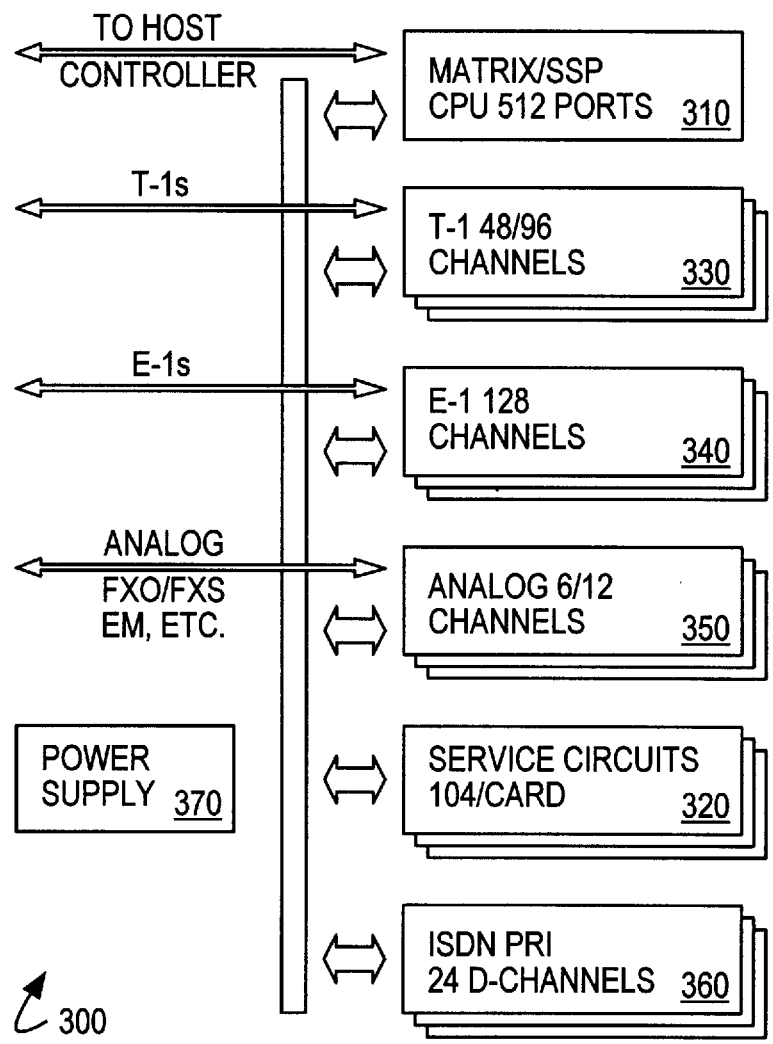
FIG. 3 illustrates a block diagram of a programmable switch constructed according to the principles of the present invention.

Turning now to FIG. 3, illustrated is a block diagram of a programmable switch 300 constructed according to the principles of the present invention. The switch 300 is modular in its design thereby allowing the switch 300 to adapt to the telecommunications network and the UUT. The switch 300 is a programmable switch that contains basic switching software and relies on instructions by the host controller for providing interface to the telecommunications network. In maintaining the flexibility of the system, the modular nature of the switch 300 further facilitates the capability to interface with UUTs employing in-band, out-of-band or a combination of signaling systems.

The switch's 300 non blocking matrix supports up to 512 non-blocking ports (generally designated 310). A multi-functional digital signal processor ("DSP") board 320 provides unrestricted access to all 512 channels and supports tone detection and tone generation. The switch 300 is configured to support T-1 spans (via a T-1 interface 330), E-1 spans (via a E-1 interface 340), analog channels (via an analog interface 350) and ISDN D-channels (via an D-channel interface 360). The switch 300 also includes a power supply 370. The switch 300 (e.g., an Excel P6-512 by Excel, Inc. of Sigamore, Mass.) is presented for illustrative purposes only and other embodiments capable of supporting the interface between the host controller and the network are well within the broad scope of the present invention.

The programmable switch 300 via the DSP board 320 can generally support a plurality of service circuit features (e.g., configuration, control and call processing tasks), tone reception features [e.g., call progress tone analysis, dual tone multi-frequency ("DTMF") digit detection], tone generation features (e.g., call progress tones, DTMF generation) and other available features (e.g., conference bridging, voice recorded announcements).

Figure 4:
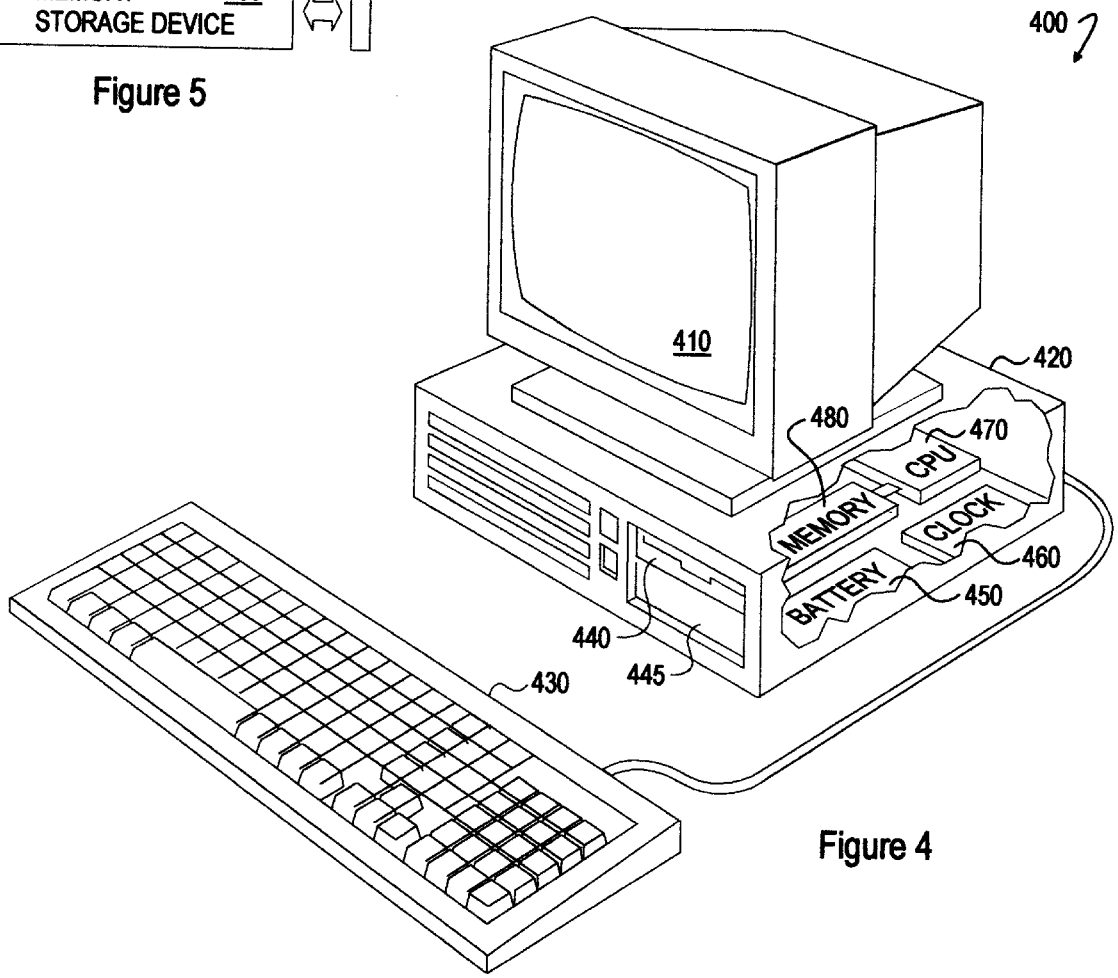
FIG. 4 illustrates an isometric view of a host controller constructed according to the principles of the present invention.

Turning now to FIG. 4, illustrated is an isometric view of a host controller 400 constructed according to the principles of the present invention. The host controller 400 is presented as a general purpose computer capable of storing and executing a sequence of instructions to test components or UUTs via at least one of in-band and out-of-band signaling paths through a network. Since the present invention is not limited to application in a computer environment, however, FIG. 4 is presented for illustrative purposes only.

The host controller 400 includes a monitor 410, a chassis 420 and a keyboard 430. The monitor 410 and the keyboard 430 cooperate to allow communication [e.g., via a GUI] between the host controller 400 and a user. Alternatively, the monitor 410 and keyboard 430 may be replaced by other conventional output input devices, respectively. The chassis 420 includes both a floppy disk drive 440 and hard disk drive 445. The floppy disk drive 440 is employed to receive, read and write to removable disks; the hard disk drive 445 is employed for fast access storage and retrieval, typically to a nonremovable disk. The floppy disk drive 440 may be replaced by or combined with other conventional structures to receive and transmit data and instructions, including without limitation, tape and compact disc drives, telephony systems and devices (including videophone, paging and facsimile technologies), and serial and parallel ports.

The chassis 420 is illustrated having a cut-away portion that includes a battery 450, clock 460, central processing unit ("CPU") 470 (e.g., Sun Microsystems Sparc 20 as manufactured by Sun Microsystems, Inc. of Mountain View, Calif.) and memory storage device 480. The call processing management, scheduling, scripting and message analysis of the present invention are, in the illustrated embodiments, formed by a cooperation of the CPU 470, the memory storage device 480 and the sequence of executable instructions, storable in the memory storage device 480 and executable in the CPU 470 to perform as specified. Although the host controller 400 is illustrated having a single CPU 470, hard disk drive 445 and memory storage device 480, the host controller 400 may be equipped with a plurality of CPUs and peripheral devices.

It should be noted that any conventional computer system having at least one CPU that is suitable to function as a host controller may replace, or be used in conjunction with, the host controller 400, including, without limitation: hand-held, laptop/notebook, mini, mainframe and supercomputers, including RISC and parallel processing architectures, as well as within computer system/network combinations. Conventional computer system architecture is more fully discussed in *Computer Organization and Architecture,* by Stallings, MacMillan Publishing Co. (3rd ed. 1993), incorporated herein by reference. Alternative computer system embodiments may be firmware-or hardware-based.

Figure 5:
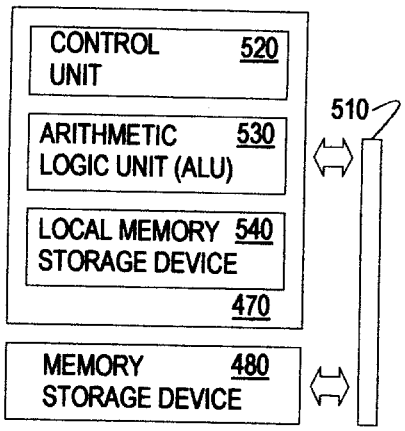
FIG. 5 illustrates a block diagram of the central processing unit ("CPU") of FIG. 4.

Turning now to FIG. 5, illustrated is a block diagram of the CPU 470 of FIG. 4. The CPU 470 is coupled to the memory storage device 380 by a data bus 510. The memory storage device 380 stores data and instructions that the CPU 470 uses to execute the functions necessary to operate the computer system 400. The memory storage device 480 may be any conventional memory storage device. The CPU 470 includes a control unit 520, arithmetic logic unit ("ALU") 530 and local memory storage device 540 (e.g. stackable cache or a plurality of registers). The control unit 520 fetches the instructions from memory storage device 480. The ALU 530, in turn, performs a plurality of operations, including addition and Boolean AND, necessary to carry out the instructions fetched from the memory storage device 480. The local memory storage device 540 provides a local high speed storage location for storing temporary results and control information generated and employed by the ALU 530. Again, the call processing management, scheduling, scripting and message analysis of the present invention is embodied in the CPU 470 in combination with the memory storage device 480.

Figure 6:
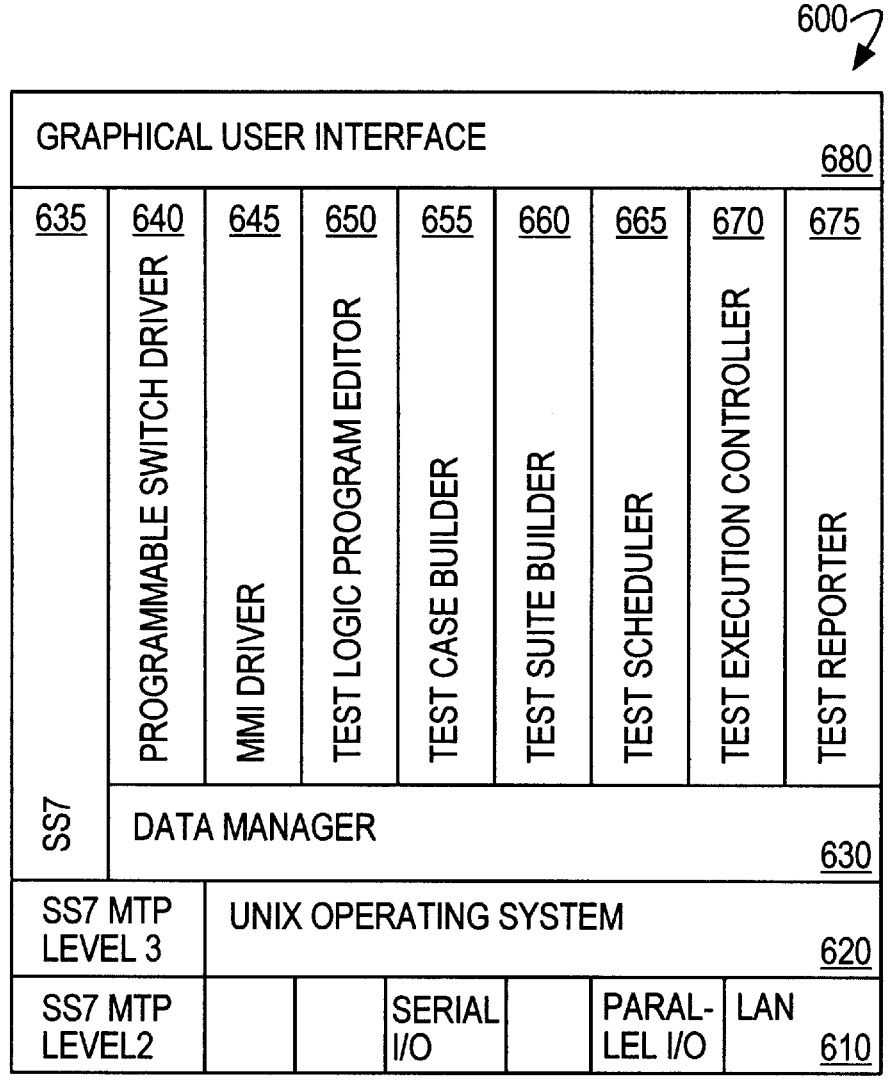
FIG. 6 illustrates a block diagram of a host controller software architecture embodying the sequence of instructions according to the principles of the present invention.

Turning now to FIG. 6, illustrated is a block diagram of a host controller software architecture 600 embodying the sequence of instructions according to the principles of the present invention. The software architecture 600 is designed for maximum flexibility in automation processing. The software architecture 600 is layered to allow for modifications to accommodate new features, loads and protocols to test a UUT.

The basic layers of the software architecture 600 are as follows. The first layer 610 comprises level 2 of the SS7 message transfer part ("MTP") encompassing serial and parallel input/output ("I/O") and local area network ("LAN") connectivity. The second layer 620 comprises level 3 of the SS7 MTP encompassing a UNIX operating system for the host controller employing the software architecture 600. In the illustrated embodiment, the software architecture 600 employs object oriented technology, recognizing SS7 object types of MTP, Integrated Services Digital Network User Part ("ISUP") and global named objects for delivering SS7 call processing messages. Again, the software architecture 600 is layered for modifications therein to accommodate other message types and protocols. The illustrated embodiment, incorporating the aforementioned message types, is presented for illustrative purposes only.

Overlaying the second layer 620 are a plurality of modules beginning with a data manager 630. The objective of the data manager 630 is to make the storage format/media transparent to the host controller. All the system data storage, retrieving and querying is managed by the data manager 630. To further isolate the host controller from its environment (such that changes to the environment are essentially transparent to the host controller), a number of interfacing modules are introduced therein. A SS7 driver 635 serves as the interface between the SS7 MTP layer and the host controller. The SS7 driver 635 establishes the physical connection to the MTP stack and provides the mechanism to send and receive SS7 ISUP messages. In the latter instance, the SS7 driver 635 receives an ISUP message from the host controller and thereafter sends the message to its destination through the underlying MTP layer. When a UUT sends an ISUP message back to the host controller, the SS7 driver 635 first receives the message and directs it to the host controller.

The programmable switch driver 640 serves as an interface between the host controller and the programmable switch. When the host controller sends a message to the programmable switch, it first forwards the message to the programmable switch driver 640 and the programmable switch driver forwards the message to the programmable switch. The reverse process occurs in the very same manner by reversing the roles of the programmable switch and host controller. In addition to message passing, the programmable switch driver 640 also provides maintenance functions such as, without limitation, rebooting the programmable switch and checking the status of the programmable switch.

A main machine interface ("MMI") driver 645 is provided to serve as an interface between the host controller and a MMI server. The MMI driver 645 establishes connectivity to the MMI server and sends and receives messages to and from the MMI server. Typically, the host controller needs to log on to, reconfigure, correspond with (for instance, for status reporting) and log off the UUT. The functionality of each UUT is dependent upon the type of UUT. The MMI driver 645 manages the interface to the MMI server (e.g., the UUT), essentially transparent to the host controller. For the purposes of the present invention, MMI refers to a generic interface to a UUT.

In addition to the interface modules, a test creation environment ("TCE") is supported by a plurality of modules including a test logic program ("TLP") editor 650, test case builder 655, test suite builder 660 and test scheduler 665. The objective of the TCE is to provide a user friendly environment so that the user can create test cases and schedule the cases for execution. The sequence of instructions created in the TCE are hierarchically structured as a test suite comprises a test case, the test case comprises a TLP, the TLP comprises a TIBB. The TIBB is an atomic entity that performs primitive processing feature functionality. The TLPs represent the test logic whereby there are originating TLPs ("OTLPs"), terminating TLPs ("TTLPs") and release trunk TLPs ("RLT TLPs"). The test case is a basic functional entity that provides a complete call processing function for a test of a feature or service of a UUT. The test scheduler schedules the execution of the test suites.

The final two modules that overlay the second layer support a test execution environment ("TEE"). The TEE includes a test execution controller 670 and a test reporter 675. The objective of the TEE is to provide a facility to invoke schedules test suites, to control and monitor test suite execution, to log results of the execution, to analyze the execution results in comparison to an expected result and to generate reports on the execution. The test execution controller 670 checks the day and time against the scheduled test suites, allocates the resources and starts the execution when the test suites are scheduled. During the execution of the test suites, the test execution controller 670 executes the test cases contained in the test suites one at a time. When executing a test case, the test execution controller 670 interprets the script of the test case, configures the UUT (if necessary), sends and receives messages on behalf of the test case, logs the messages and performs other servicing functions. After the execution of the test suites, the test execution controller 670 collects the logged messages and compiles those messages with the expected and execution results. The test reporter 675 then analyzes the results and generates a report. Although a GUI is not required for the operation of the system of the present invention, a GUI module 680 provides the ultimate interface to the user.

Figure 7:
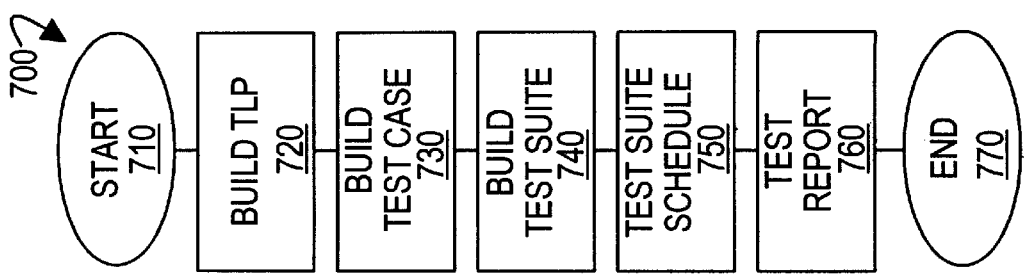
FIG. 7 illustrates a flow diagram of a method of building a test suite according to the principles of the present invention.

Turning now to FIG. 7, illustrated is a flow diagram of a method 700 of building a test suite according to the principles of the present invention. The method 700 begins at a start step 710 where a user engages a GUI associated with a host controller of the present invention. Alternatively, the user may employ other devices in lieu of the GUI to engage the host controller to build the test suite for testing a UUT.

The method 700 of building the test suite begins with the TIBBs. In a build TLP step 720, the user employs a TLP editor to create the TLPs by selecting specific TIBBs into the editor, populating data to their parameters, connecting the TIBBs logically and then setting up call processing data. The user then transitions to a test case builder in a test case build step 730. The user constructs test cases by combining an OTLP with a TTLP or optionally with a RLT TLP. The user can construct one or more test cases by varying the TLPs or the parameters therein. The user specifies signaling type, addressing type and other properties in creating test cases. The user also inputs data to configure the UUT and may input expected test results during the test case build step 730.

The method 700 continues at a test suite build step 740. At this point, the user combines the test cases into test suites by employing a test suite builder. Once the test suites are configured, the user may schedule the day and time for the execution of the test suites at a test suite schedule step 750. Once the test suites are executed the user may generate test reports analyzing the UUT with a comparison of expected verses actual test results, if requested, during a generate a test report step 760. Finally, the method 700 of constructing and executing the test suite ends at an end step 770.

Figure 8:
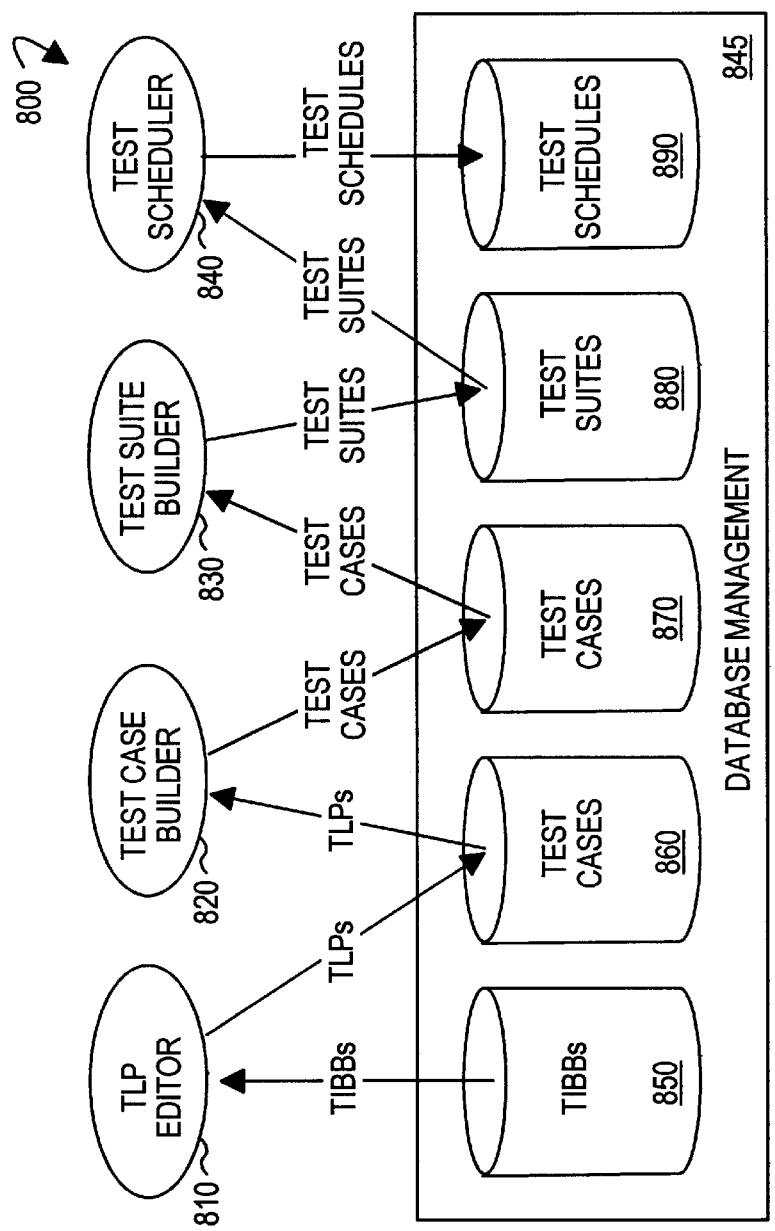
FIG. 8 illustrates a block diagram of a test creation environment ("TCE") according to the principles of the present invention.

Turning now to FIG. 8, illustrated is a block diagram of a TCE 800 according to the principles of the present invention. The TCE 800 supports the creation of new call processing test cases. The TCE 800 is designed with several objectives including, without limitation, vendor platform independence, test case creation productivity and flexibility and accuracy of test case execution. The TCE 800 is developed with an open system architecture and industry standard and development tools allowing a direct relationship between the creation and execution of data. The TCE 800 generally employs an object oriented development methodology. The TCE 800 supports a functional, test independent approach to call processing simulation wherein a signaling scheme selection is provided with test building blocks.

Again, the TCE 800 offers four layers of user interface, namely, a TLP editor 810, test case builder 820, test suite builder 830 and test scheduler 840. In short, the TLP editor 810 provides diagram/parameter creation and modification; the test case builder 820 combines TLPs and provides UUT data; the test suite builder 830 builds test suites from the test cases; the test scheduler 840 schedules the execution of the test suites. The database manager 845 generally comprises a plurality of loosely coupled modules including a TIBB module 850, first and second portion of a test case module 860, 870, test suite module 880 and test scheduler module 890. The TIBB module 850 and first portion of the test case module 860 are coupled to the TLP editor 810; the first and second portion of the test case module 860, 870 are coupled to the test case builder 820; the second portion of the test case module 870 and test suite module 880 are coupled to the test suite builder 830; the test suite module 880 and test scheduler module 890 are coupled to the test scheduler 840. The database manager 845 demonstrates that there is no direct coupling among the modules therein. The interconnection between the modules is only through data making the development and maintenance of the TCE uncomplicated.

Figure 9:
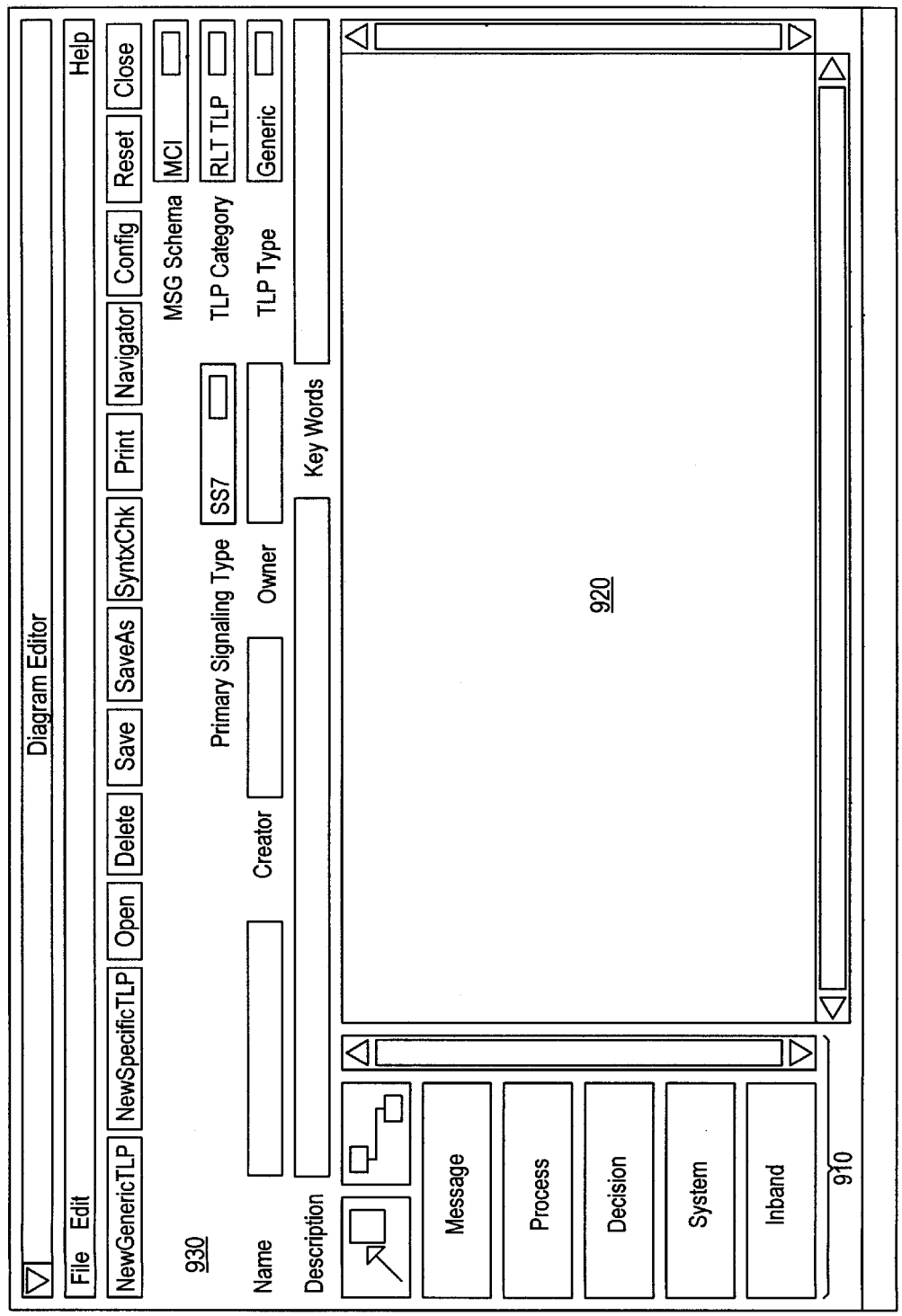
FIG. 9 illustrates a view of a configuration window of the graphical user interface ("GUI") showing, in particular, a test logic program ("TLP") editor menu.

Turning now to FIG. 9, illustrated is a view of a configuration window of the GUI showing, in particular, a TLP editor menu 900. The TLP editor is a generic graphic editor tailored to suit test case building needs. It provides a palette of TIBBs 910 from which a user can select building blocks to build and display the TLPs in a TLP graphic area 920. To create a TLP, the user selects the TIBBs from the TIBB palette, drops the TIBBs into the graphic area 920, connects the TIBBs to establish a logic and, optionally, edits the contents of the expected results. Once the TLP is built, the user may save the TLP into the database and prepare a syntax check to clean-up any errors.

The TLP editor menu 900 is supported by a plurality of TLP level and graphical operations available via a plurality of operational icons 930. The operational icons 930 include TLP level operations (e.g., open, create, delete, query, name, description of and save a TLP) and graphic operations (e.g., cut, copy, paste, drag a TLP, group, populate parameter values). The TLP editor menu 900 provides a user friendly graphical interface for the user.

Figure 10:
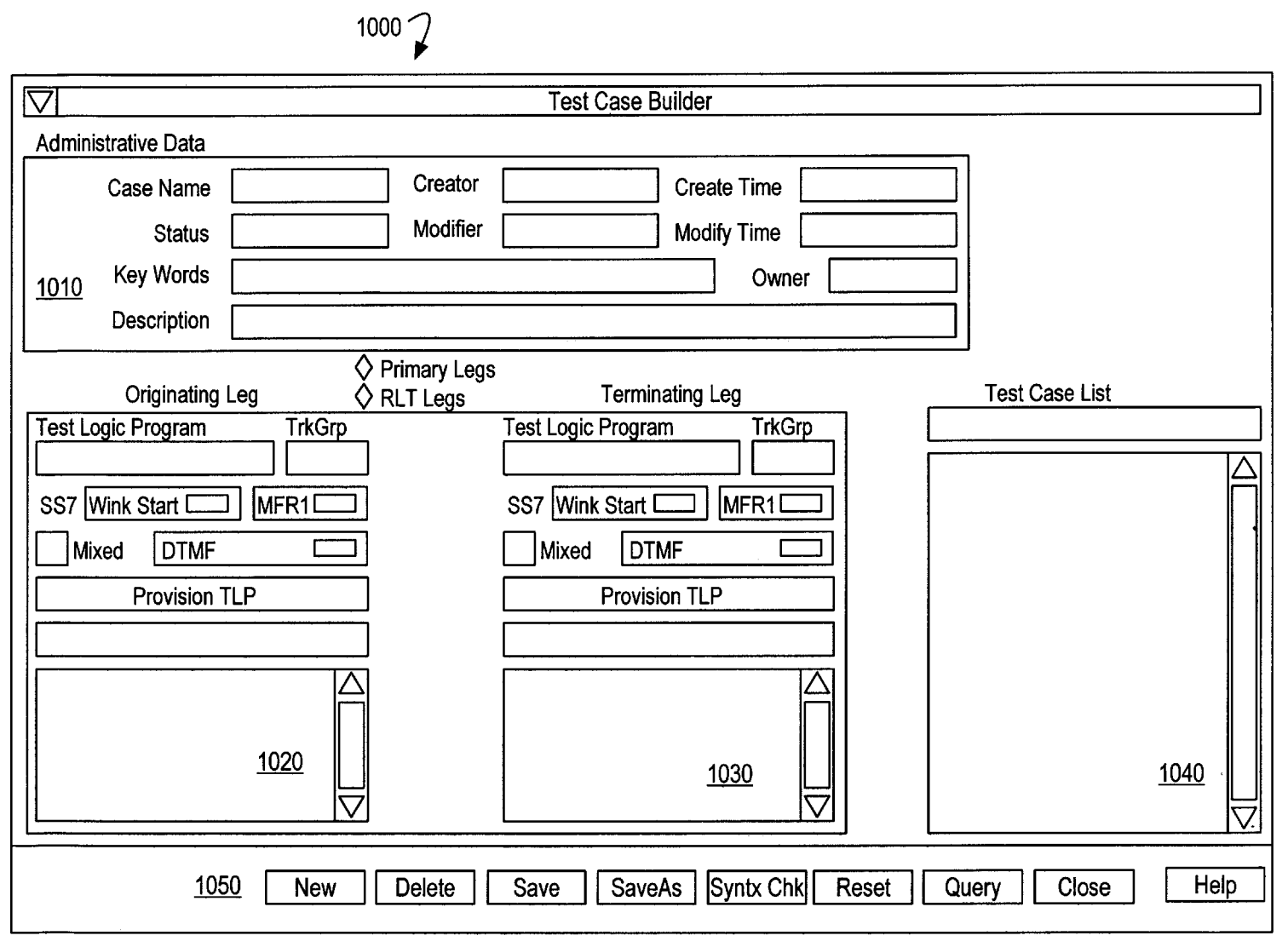

Turning now to FIG. 10, illustrated is a view of a configuration window of the GUI showing, in particular, a test case builder menu 1000. The test case defines a complete call processing logic regarding a feature/service of a UUT. A test case may include an OTLP, TTLP and RLT TLP. The test cases are UUT independent allowing for flexibility to test all types of UUTs. The test case builder menu 1000 provides a graphical interface for a user to create the test cases.

The test case builder menu 1000 includes an administrative data area 1010 for describing information about the test case. The test case builder menu 1000 further includes a originating leg and terminating leg area 1020, 1030 for selecting the TLPs for the originating and terminating legs of the test case, respectively. The test case builder menu 1000 still further includes a test case list area 1040 for illustrating a menu of test cases. Finally, the test case builder menu 1000 includes operational icons 1050 to support the windows interface in building the test cases. The functions supported by the operational icons 1050 include, without limitation, creating, renaming, modifying and syntax checking test cases.

Figure 11:
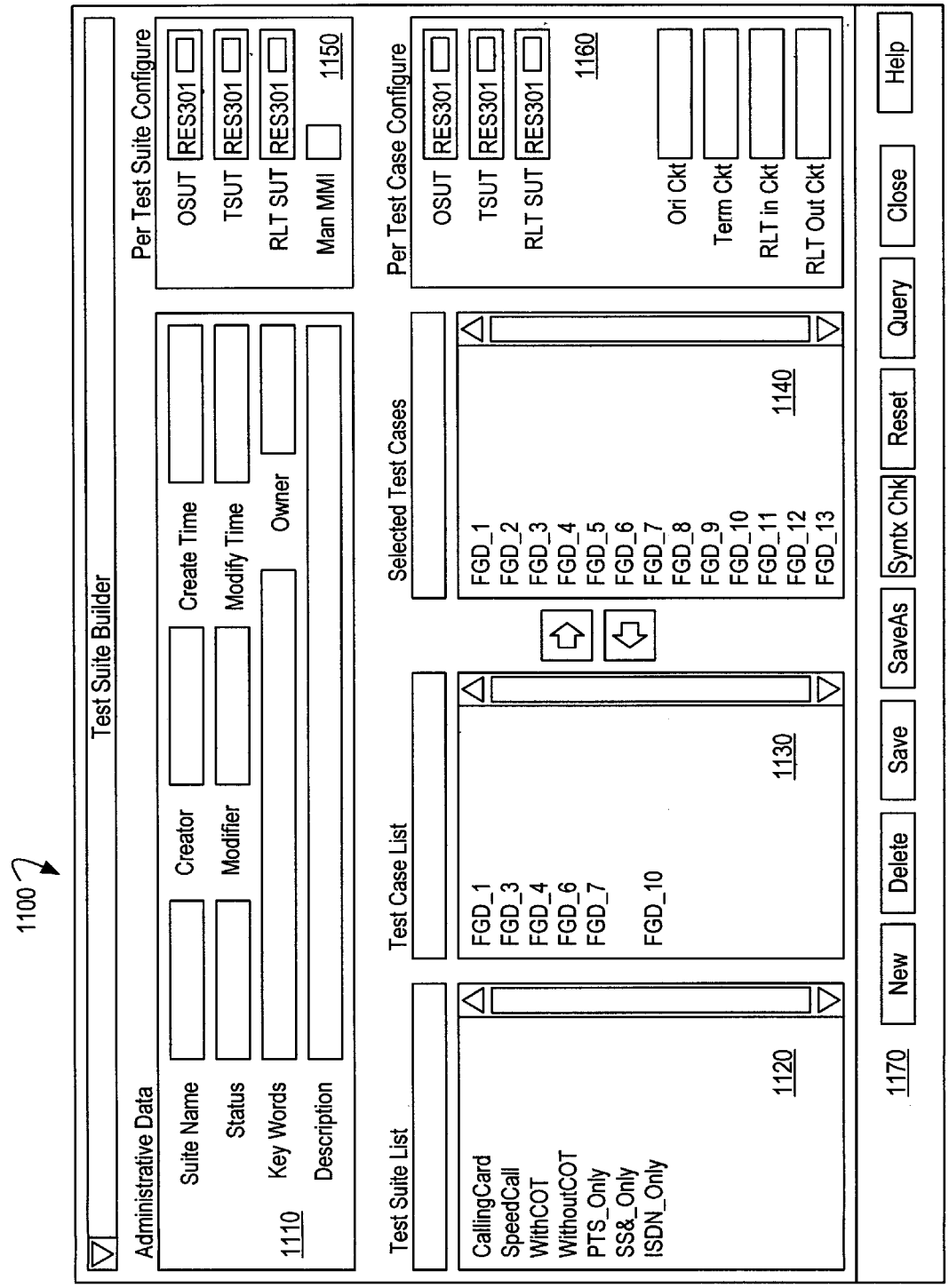
FIG. 11 illustrates a view of a configuration window of the GUI showing, in particular, a test suite builder menu.

Turning now to FIG. 11, illustrated is a view of a configuration window of the GUI showing, in particular, a test suite builder menu 1100. The test suite generally comprises a plurality of test cases that may be executed by the test scheduler. The test suite builder is designed to provide a user friendly graphic facility to, without limitation, create, modify, delete and query test suites via the test suite builder menu 1100.

The test suite builder menu 1100 provides a graphical interface for the user to create the test suites. The test suite builder menu 1100 includes an administrative data area 1110 for describing information about the test suite. The test suite builder menu 1100 further includes a test suite list area 1120 specifying particular test suites including, without limitation, calling card call, speed call and ISDN signaling.

The test suite builder menu 1100 further includes a test case list area 1130 and selected test case area 1140 for illustrating a menu of test cases and selected test cases, respectively. The test suite builder menu 1100 still further includes a first and second configuration area 1150, 1160 to provide for the automatic configuration of the UUTs. Finally, the test suite builder menu 1100 includes operational icons 1170 to support the windows interface in building the test suites. The functions supported by the operational icons 1170 include, without limitation, creating, renaming, modifying and syntax checking test suites.

Turning now to FIG. 12, illustrated is a view of a configuration window of the GUI showing, in particular, a test scheduler menu 1200. A test schedule defines a future execution of a test suite. The test schedule defines attributes such as scheduled identification, test suite name, starting date, time and description of the test suite. The test scheduler menu 1200 is designed to provide a user friendly graphical environment to, without limitation, create, delete and modify test schedules.

The test scheduler menu 1200 provides a graphical interface for the user to create the test schedules. The test scheduler menu 1200 includes a schedule data area 1210 for describing specific information about the schedule for executing a test suite. The test scheduler menu 1200 further includes a scheduler graphics area 1220 to display scheduling information for each selected test suite. The test scheduler menu 1200 still further includes a test suite list area 1230 for specifying particular test suites including, without limitation, calling card call, speed call and ISDN signaling. Finally, the test scheduler menu 1200 includes operational icons 1240 to support the windows interface in scheduling the test suites. The functions supported by the operational icons 1240 include, without limitation, saving, deleting and closing test schedules.

Figure 13:
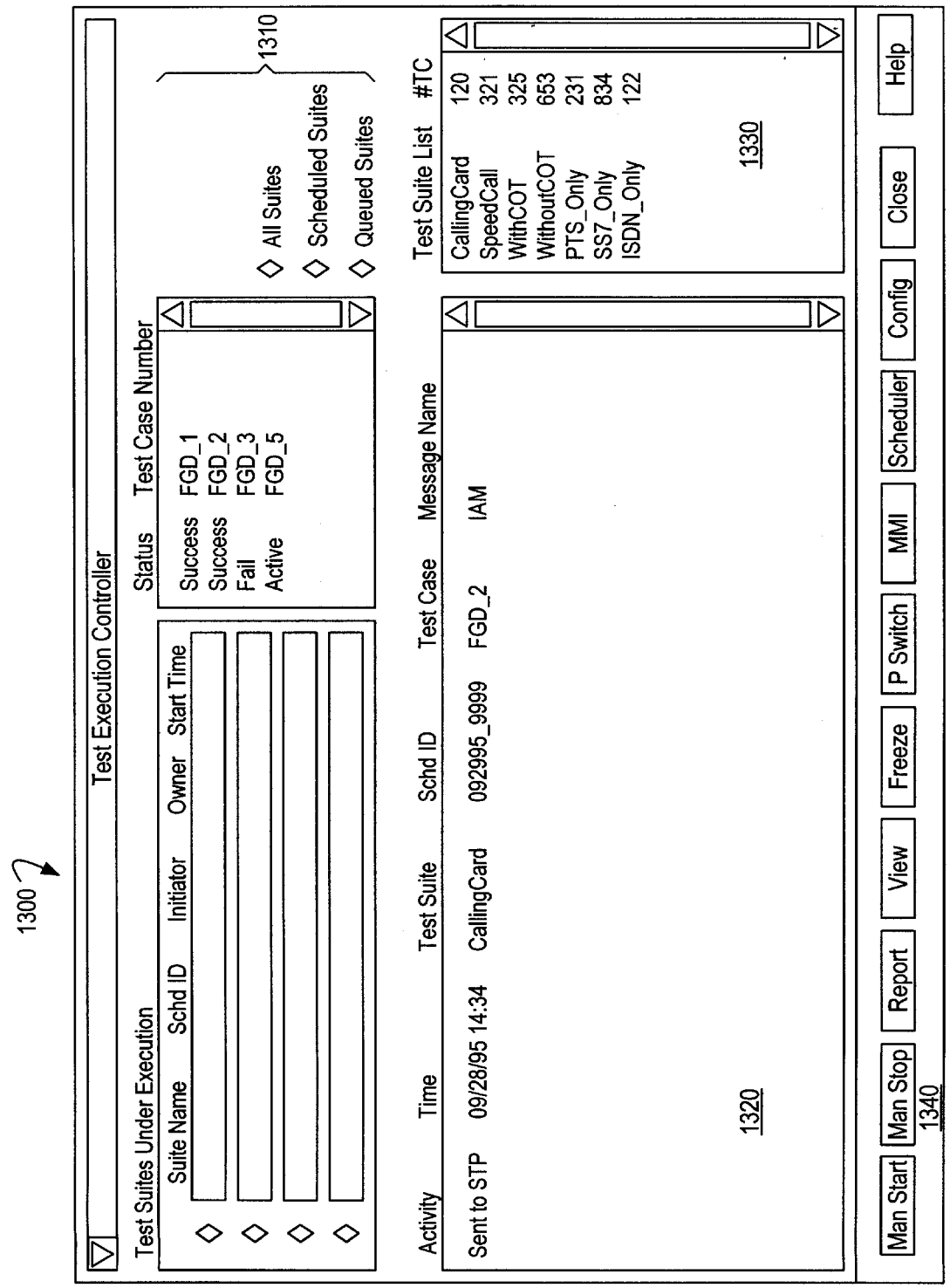
FIG. 13 illustrates a view of a configuration window of the GUI showing, in particular, a test execution controller menu.

Turning now to FIG. 13, illustrated is a view of a configuration window of the GUI showing, in particular, a test execution controller ("TEC") menu 1300. The TEC continually monitors the host controller for scheduled test suites. When an execution time of a scheduled test suite occurs, the TEC allocates the resources to execute the test suite. During the execution of the test suite, the TEC logs the execution results into a file for analysis by a test reporter. In addition to scheduling the execution of test suites, the TEC can also start and stop an execution of the test suite manually. The TEC menu 1300 is designed to provide a user friendly graphical environment for, without limitation, the execution of test suites.

The TEC menu 1300 provides a graphical interface for the user to execute the test suites. The TEC menu 1300 includes a test suite under execution area 1310 for describing information about the test suites under execution. The TEC menu 1300 further includes an execution graphics area 1320 to display execution information for each executed test suite. The TEC menu 1300 still further includes a test suite list area 1330 specifying particular test suites including, without limitation, calling card call, speed call and ISDN signaling. Finally, the TEC menu 1300 includes operational icons 1340 to support the windows interface in scheduling the execution of the test suites. The functions supported by the operational icons 1340 include, without limitation, manual start and stop, view, MMI and close the execution of the teat suite.

Figure 14:
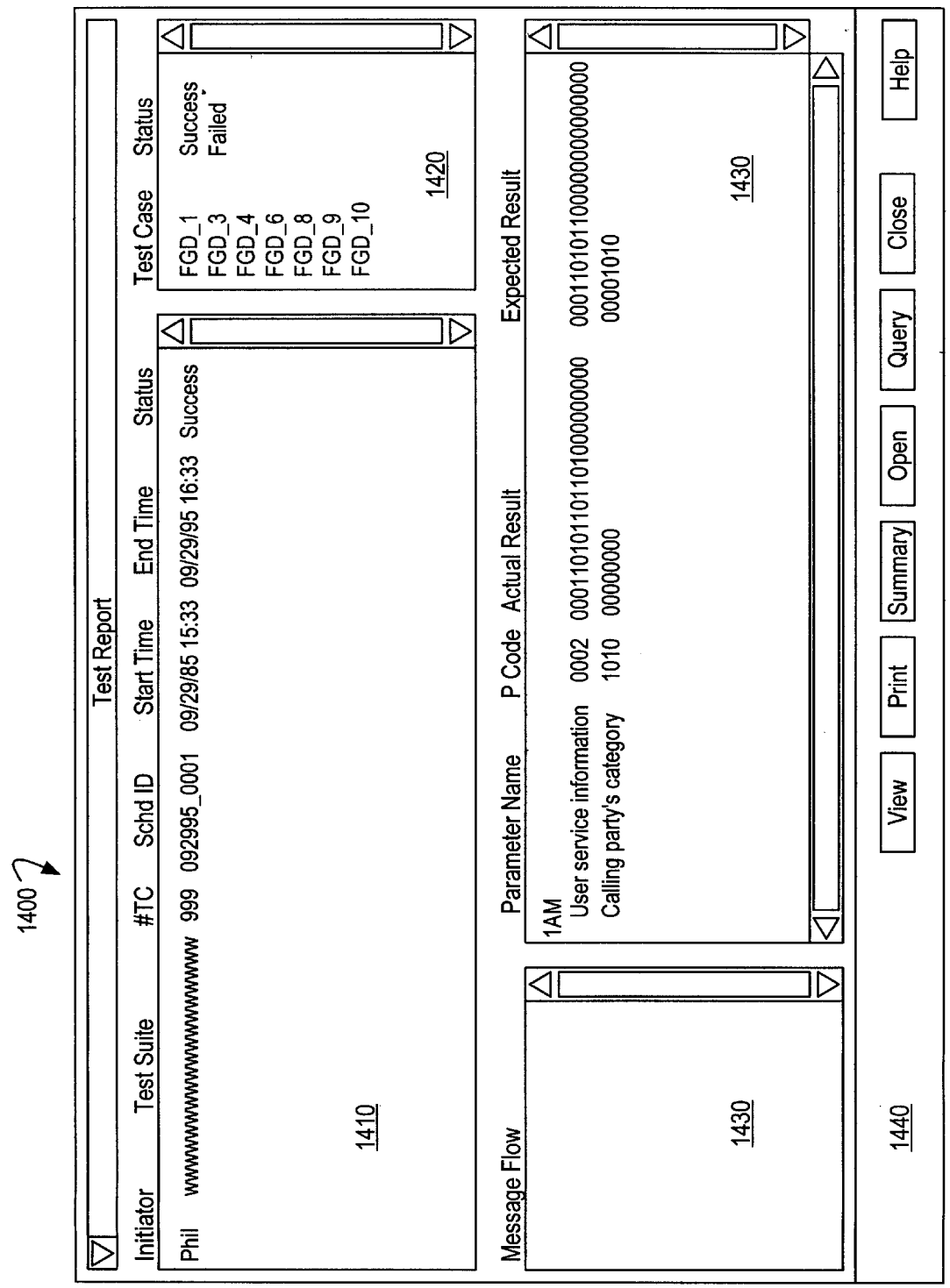
FIG. 14 illustrates a view of a configuration window of the GUI showing, in particular, a test reporter menu.

Turning now to FIG. 14, illustrated is a view of a configuration window of the GUI showing, in particular, a test reporter menu 1400. The test reporter analyzes the execution results and generates reports on the analysis. The test reporter also provides the mechanism to support a message validation system whereby call processing events and messages originating or terminating on a UUT may be stored and compared to expected results to validate an operation of the UUT. The test reporter menu 1400 provides a window where a user may view the execution result, compare the expected and actual result and discern a status of each test case during the execution of a test suite.

The test reporter menu 1400 provides a graphical interface for the user to view executed test results. The test reporter menu 1400 includes an executed test suite and test case area 1410, 1420 for describing information about the execution the test suite and case. The test reporter menu 1400 still further includes a reporter graphics area 1430 to display the test results (with a comparison of expected results, if requested) and message flow information. Finally, the test reported menu 1400 includes operational icons 1440 to support the windows interface in reporting the execution of the test suites. The functions supported by the operational icons 1440 include, without limitation, viewing, printing, providing a summary of and closing test reports.

From the above, it is apparent that the present invention provides, for use in a telecommunications network containing a UUT, a system for, and method of, providing in-band and out-of-band signals to test and analyze the UUT. The system includes: (1) a programmable switch coupled to the UUT through the telecommunications network via an in-band and out-of-band signaling path capable of providing in-band and out-of-band signaling to the UUT and (2) a host controller coupled to the switch for communication of data therebetween, the host controller further couplable to the UUT via an out-of-band signaling path capable of providing out-of-band signaling to the UUT, the host controller capable of storing and executing a sequence of instructions to test the UUT via at least one of the in-band and out-of-band signaling paths, the switch being programmable and the sequence of instructions being adaptable to allow the switch and the host controller to adapt to a particular signaling protocol of the UUT.

Although the present invention and its advantages have been described in detail, those skilled in the art should understand that they can make various changes, substitutions and alterations herein without departing from the spirit and scope of the invention in its broadest form.

What is claimed is:

1. A system for providing in-band and out-of-band signals to test a component to be tested (UUT) in a telecommunications network, comprising:

a programmable switch coupled to said UUT through said telecommunications network via an in-band and out-of-band signaling path configured to provide in-band and out-of-band signaling to said UUT; and a host controller coupled to said switch for communication of data therebetween, said host controller further couplable to said UUT via an out-of-band signaling path configured to provide out-of-band signaling to said UUT, said host controller capable of storing and executing a sequence of instructions to test said UUT via at least one of said in-band and out-of-band signaling paths, said switch being programmable and said sequence of instructions being adaptable to allow said switch and said host controller to adapt to a particular signaling protocol of said UUT.

2. The system as recited in claim 1 wherein said sequence of instructions is hierarchically structured as a test suite comprising a test case, said test case comprising a test logic program (TLP), said TLP comprising a test independent building block (TIBB).

3. The system as recited in claim 1 wherein said host controller comprises a graphical user interface (GUI) for allowing a user to manipulate symbols presented on said GUI to define said sequence of instructions.

4. The system as recited in claim 3 wherein said GUI provides fields for said user to enter data pertaining to a test.

5. The system as recited in claim 3 wherein said GUI presents a series of test results to said user.

6. The system as recited in claim 1 wherein said switch is embodied as a plurality of modules, thereby allowing said switch to adapt to said telecommunications network and said UUT.

7. The system as recited in claim 1 wherein said host controller is capable of receiving result data from said UUT via said switch.

8. The system as recited in claim 1 wherein said particular signaling protocol is an out-of-band signaling protocol selected from the group consisting of:

D-channel Signaling of an Integrated Services Digital Network (ISDN), and

Signaling System 7 (SS7).

9. The system as recited in claim 1 wherein said particular signaling protocol is an in-band signaling protocol selected from the group consisting of:

Dual Tone Multi-Frequency (DTMF), and

Multi-Frequency R1 (MFR1).

10. The system as recited in claim 1 wherein said host controller comprises circuitry for scheduling an execution time for said sequence of instructions.

11. The system as recited in claim 1 wherein said host controller comprises a user interface for allowing a user to define a sequence of instructions and expected results, said host controller compiling a series of tests results and validating said test results, said host controller further generating a report reflecting said test results.

12. A method of providing in-band and out-of-band signals to test a component to be tested (UUT) in a telecommunications network, comprising the steps of:

coupling a programmable switch to said UUT through said telecommunications network to establish a signaling path configured to provide in-band and out-of-band signaling to said UUT; and coupling a host controller to said switch for communication of data therebetween, said host controller further couplable to said UUT to establish an out-of-band signaling path configured to provide out-of-band signaling to said UUT, said host controller capable of storing and executing a sequence of instructions to test said UUT via at least one of said in-band and out-of-band signaling paths, said switch being programmable and said sequence of instructions being adaptable to allow said switch and said host controller to adapt to a particular signaling protocol of said UUT.

13. The method as recited in claim 12 wherein said sequence of instructions is hierarchically structured as a test suite comprising a test case, said test case comprising a test logic program (TLP), said TLP comprising a test independent building block (TIBB).

14. The method as recited in claim 12 wherein said step of coupling said host controller comprises the step of providing a graphical user interface (GUI) for allowing a user to manipulate symbols presented on said GUI to define said sequence of instructions.

15. The system as recited in claim 14 wherein said step of coupling said host controller comprises the step of providing fields for said user to enter data pertaining to a test via said GUI.

16. The system as recited in claim 14 wherein said step of coupling said host controller comprises the step of presenting a series of test results to said user via said GUI.

17. The method as recited in claim 12 wherein said switch is embodied as a plurality of modules, said method further comprising the step of allowing said switch to adapt to said telecommunications network and said UUT.

18. The method as recited in claim 12 further comprising the step of receiving result data from said UUT into said host controller via said switch.

19. The method as recited in claim 12 wherein said particular signaling protocol is an out-of-band signaling protocol selected from the group consisting of:

D-channel Signaling of an Integrated Services Digital Network (ISDN), and

Signaling System 7 (SS7).

20. The method as recited in claim 12 wherein said particular signaling protocol is an in-band signaling protocol selected from the group consisting of:

Dual Tone Multi-Frequency (DTMF), and

Multi-Frequency R1 (MFR1).

21. The method as recited in claim 12 further comprising the step of scheduling an execution time for said sequence of instructions.

22. The method as recited in claim 12 wherein said step of coupling said host controller further comprises the steps of:

providing a user interface for allowing a user to define a sequence of instructions and expected results;

compiling a series of tests results;

validating said test results, and generating a report reflecting said test results.

* * * * *

UNITED STATES PATENT AND TRADEMARK OFFICE
CERTIFICATE OF CORRECTION

PATENT NO. :     5,835,566
DATED     :     November 10, 1998
INVENTOR(S) :     Cowgill It is certified that error appears in the above-indentified patent and that said Letters Patent is hereby corrected as shown below:

Col. 15, line 62, "teat" should be --test.--

Signed and Sealed this

Fourth Day of May, 1999

*Attest:*

Q. TODD DICKINSON

*Attesting Officer*      Acting Commissioner of Patents and Trademarks